(12) United States Patent
Zacche (10) Patent No.: US 8,956,149 B2
(45) Date of Patent: Feb. 17, 2015

(54) SYSTEM FOR HANDLING OBJECTS IN ROTARY MACHINES

(71) Applicant: SMI S.p.A., Bergamo (IT)

(72) Inventor: Vanni Zacche, Bergamo (IT)

(73) Assignee: SMI S.p.A., Bergamo (IT)

( * ) Notice: Subject to any disclaimer, the term of this patent is extended or adjusted under 35 U.S.C. 154(b) by 51 days.

(21) Appl. No.: 13/799,926

(22) Filed: Mar. 13, 2013

(65) Prior Publication Data

US 2013/0243895 A1  Sep. 19, 2013

(30) Foreign Application Priority Data

Mar. 14, 2012  (IT) .............................. MI2012A0397

(51) Int. Cl.
| B29C 49/36 | (2006.01) |
| B29D 22/00 | (2006.01) |
| B29C 49/42 | (2006.01) |
| B65G 47/86 | (2006.01) |
| B29C 49/68 | (2006.01) |

(52) U.S. Cl.
CPC .......... *B29D 22/003* (2013.01); *B29C 49/4205* (2013.01); *B65G 47/847* (2013.01); *B65G 2201/0247* (2013.01); *B29C 49/36* (2013.01); *B29C 49/4215* (2013.01); *B29C 49/68* (2013.01)
USPC ..................... 425/534; 198/470.1; 198/476.1; 425/540

(58) Field of Classification Search
USPC ...................... 425/534, 540; 198/470.1, 476.1
See application file for complete search history.

(56) References Cited

U.S. PATENT DOCUMENTS

| 4,850,850 A | * | 7/1989 | Takakusaki et al. | .......... 425/526 |
| 5,232,717 A | | 8/1993 | Voss | |
| 5,509,796 A | * | 4/1996 | Di Settembrini | ............. 425/526 |
| 8,431,069 B2 | * | 4/2013 | Dordoni et al. | ............... 264/537 |
| 2008/0113061 A1 | * | 5/2008 | Stoiber et al. | ................. 425/522 |

FOREIGN PATENT DOCUMENTS

| EP | 2 100 815 A1 | 9/2009 |
| EP | 2 412 651 A1 | 2/2012 |
| WO | WO 2010/084204 A1 | 7/2010 |

OTHER PUBLICATIONS

Machine translation of EP2100815 A1 dated Sep. 2009 obtained from the esp@ce.net website, especially paragraph 48, pp. 19 and 20 of the translation.*

* cited by examiner

*Primary Examiner* — Robert B Davis
(74) *Attorney, Agent, or Firm* — Dickstein Shapiro LLP (57) ABSTRACT

A system for handling objects in rotary machines, and, more particularly, a system for handling preforms in blowing machines. The system picks up a pre-heated preform from a transferring star of the preform and takes it to a mold of a stretch-blowing machine by using movements entailing reduced acceleration values, in particular of the tangential acceleration component, so as to prevent uncontrolled oscillatory movements of the softened preform. In the blowing machine, the preform is blown to obtain a bottle, and the bottle thus obtained is picked up from the stretch-blow molding position and transferred to an unloading position.

12 Claims, 10 Drawing Sheets

SYSTEM FOR HANDLING OBJECTS IN ROTARY MACHINES

FIELD OF THE DISCLOSURE

The present invention relates to a system for handling objects in rotary machines, in particular it relates to a system for handling preforms in blowing machines, able to pick up a pre-heated preform from a pick-up position of the preform, take it to a stretch-blow moulding position in the blowing machine, in which the preform is blown to obtain a bottle, picking up the bottle thus obtained from the stretch-blow moulding position and transferring it to an unloading position of the bottle.

The invention also relates to a stretch-blow moulding machine having at least one such automatic handling system. The invention relates, in addition, to a stretch blow moulding system comprising at least one stretch-blow moulding machine having at least one such automatic handling system.

BACKGROUND

In the production of bottles in polymer material a method is known for making plastic bottles starting from a preform in plastic or polymer material comprising a pre-heating step of the preform at a predefined process temperature, a transfer step of the preheated preform to a mould and insertion therein, and a blowing step inside the preform positioned in the mould in a closed position, of air at a predetermined pressure so that the preform is inflated inside a cavity made in the mould, shaped like the bottle to be obtained, until the preform, inflated by said pressurised air, adheres to the walls of the cavity, cooling upon contact and stiffening, thereby acquiring the definitive shape of the bottle to be obtained. As well as the blowing step described, there may also be a step of stretching the preform when softened, suitable for elongating or mechanically extending the preform being prepared and simultaneously with the blowing. Such combined method is called stretch-blowing.

The above method is performed by automatic machines which, to ensure a greatly reduced unit cost, must implement a very high hourly production rate.

To maximise efficiency, the preforms need to be moved at high speed along a circuit between the output of a preheating furnace and the mould, passing through one or more movement devices comprising the aforesaid feed device suitable for positioning one preform at a time in the mould.

Such circuit is generally formed of straight and curved sections having different curvatures and therefore speed variations of modulus and direction at the point of changes in direction, thereby causing damaging accelerations for the preheated preform.

The problem of acceleration is particularly felt in the passage of the preform from the feed device to the mould on account of the oscillatory movements which are triggered on the preheated, therefore softened preform, as a result of the aforesaid acceleration.

To better describe the aforesaid drawback of the prior art the preform and its behaviour along the aforesaid circuit must be described in more detail.

The preform has generally an elongated tubular shape having a first open end having a mouth and a second opposite closed end. The preform is transported hanging vertically, gripped at the mouth.

In the pre-heating furnace the preform is brought to the softening point, so as to be subsequently inflated inside the cavity in the mould.

It is evident that the preform, in the above conditions, being softened, reacts to the accelerations it is subjected to by gently swinging like a pendulum and deforming in relation to its mouth. The oscillation caused by an acceleration can be summed to a previous acceleration not yet damped producing an uncontrolled oscillation movement of the preheated preform. Such uncontrolled movement of the preform may persist even when the preform is inserted in the mould, with the risk of brushing against the mould in some points before the stretch-blowing step cooling and solidifying irregularly in that point and thereby giving rise to a bottle or container with moulding defects.

Returning to the known stretch-blowing systems, a widely used method is to use a stretch-blowing machine of the type rotating around to a vertical axis. Such machine generally comprises a plurality of moulds positioned radially in relation to the axis of the machine and provided with opening/closing means of the moulds, operable in a manner synchronised with the corresponding movement devices of the preform.

Sometimes such movement devices comprise a transferring star. A transferring star is taken to mean for example a support having a plurality of seats for receiving a preform positioned spaced tangentially around a rotation axis, in particular along a circumference with its centre in the rotation axis. Such transferring star is suitable for sequentially supplying the preforms to the mould of the blowing machine.

In the conventional machines, in the passage from the transferring star to the mould of the rotary machine, the preform may be subject to brusque speed variations back and forth, and thus an acceleration, with the drawbacks mentioned above.

The acceleration to which the preform is subjected is formed by a tangential component along the direction of advancement and a radial component orthogonal thereto.

While the known systems are generally able to keep the radial component of the acceleration at a low value, the value of the tangential component has often an high value, to the order of hundreds of m/s$^2$.

The need is therefore felt to provide a handling system of a preform able to pick it up from a feed device and rapidly transfer it to a stretch-blow moulding position by movements entailing reduced acceleration values, in particular of the tangential acceleration component, so as to prevent uncontrolled oscillatory movements of the softened preform from being triggered.

SUMMARY OF THE INVENTION

The problem addressed by the present invention is to provide a system for handling objects between a transferring star and a rotary machine comprising a plurality of processing units which overcomes the drawbacks described above.

A further purpose of the present invention is to make available a handling system of preforms in blowing or stretch-blowing machines able to pick up a preheated preform from a transferring star of the preform and take it to a mould of a stretch-blowing machine, which makes it possible to overcome the drawbacks described above.

Such problem is solved by a handling system in rotary machines as delineated in the appended claims, the definitions of which form an integral part of this description.

BRIEF DESCRIPTION OF THE DRAWINGS

Further features and advantages of the present invention will be more clearly comprehensible from the description given below of some of its embodiments, made by way of a non-limiting example, with reference to the following drawings.

DETAILED DESCRIPTION OF THE PREFERRED EMBODIMENTS

The term "blow-moulding machine" or "blowing machine" is understood to mean any type of machine having at least one mould which can be opened defining a cavity therein, in which a preform is made to expand by blowing air at a predetermined pressure inside it.

The term "stretch blow-moulding machine" or "stretching-blowing machine" is understood to mean a blowing machine further comprising stretching means, comprising for example an element which penetrates inside the preform through the mouth and pushes the end of the preform opposite the mouth from the inside elongating the preform so as to prepare it for blowing or simultaneously.

With reference to the figures, reference numeral 100 globally indicates a system according to the invention, for handling objects 133, 133' between a transferring star schematically indicated by reference numeral 130 and a rotary machine schematically indicate by reference numeral 1.

The rotary machine comprises, for example, a plurality of processing units 10, and the transferring star 130 comprises along its perimeter 136 a plurality of seats 13, 13' to house said objects 133.

Said processing units 10 are spaced apart at a first pitch 151 along a first circumference 155 and the seats 134, 134' are spaced apart at a second pitch 131 along a second circumference 136, wherein the second pitch 131 is different from the first pitch 151 and wherein the circumferences 155 and 136 are not tangent.

The aforesaid handling system 100 comprises a gripping unit 112 for each processing unit 10, and the gripping unit 112 comprises a gripping nipper 103 able to grip the object 133.

Such system further comprises mean of moving 102, 202 the gripping nipper 103 suitable for alternately moving the nipper 103 between a first radial position, at the processing unit 10 and a second radial position at a seat 134, 134' of the transferring star 130.

More specifically, the first radial position lies on the first circumference 155 and the second radial position lies on the second circumference 136.

According to one embodiment, the aforesaid objects 133, 133' are preforms made of polymer material for making bottle or containers 141, the aforesaid rotary machine 1 is a stretch-blowing machine for preforms 133 and the aforesaid processing units 10 are stretch-blowing moulding units.

In a possible embodiment, for example the aforesaid moulding units 10 are of the type shown in the Italian patent application no. MI2011A002033, in the name of the same Applicant. However, other embodiments of the moulding unit for stretch-blowing machines may also be used.

The aforesaid rotary machine 100 may alternatively, be a blowing machine for preforms in the cases in which the moulding does not provide for the preventive or simultaneous stretching of the preform with the blowing.

According to one embodiment said movement means of 102, 202 of the gripping nipper 103 are configured to make the nipper translate in a radial direction in relation to the rotation axis 2 of the rotary machine 1 alternately between an extended position lying on said second circumference 136 and a retracted position lying on said first circumference 155.

According to one embodiment said movement means 102, 202 of the gripping nipper 103 are configured to make the nipper 103 translate in a radial direction in relation to the rotation axis 2 of the rotary machine 1 alternately between an extended position lying on said second circumference 136 and a retracted uncoupled position lying on an uncoupling circumference 159 concentric with said first circumference 155 and having a radius R3 less than the radius R2 of said first circumference 155.

In one embodiment said movement means 102, 202 of the gripping nipper 103 act contemporarily with the rotation of the rotary machine 1, conducting the gripping nipper 103 along a curved section 161 of trajectory tangent to said first circumference 155 in a first point of tangency 162 and tangent to said second circumference 136 in a second point of tangency 163.

In one embodiment said movement means 102, 202 of the gripping nipper 103 act contemporarily with the rotation of the rotary machine, conducting the gripping nipper 103 along a curved section 161 of trajectory having its centre of curvature on the rotation axis 2 of the rotary machine and having a radius varying from a first value corresponding to the radius of the first circumference 155 and a second value corresponding to the radius of the second circumference 136.

According to one embodiment said variable radius varies in a linear manner in relation to time.

According to one embodiment the trajectory of the nipper 103 between the second point 163 and the first point 162 is such that the tangential acceleration of the nipper 103 is negligible.

According to one embodiment said movement means 102, 202 of the gripping nipper 103 act contemporarily with the rotation of the rotary machine, conducting the nipper 103 along a predefined trajectory 161 between a point 163 lying on said second circumference 136 and a point 162 lying on said first circumference 155, wherein at least in said points on said first and second circumference 155, 136, the tangential acceleration of the nipper 103 is negligible.

In other words, the combination of the rotation movement of the nipper 103 around the rotation axis 2 of the machine 1 and the translation movement of the nipper 103 in a radial direction in relation to the rotation axis 2 of the machine, produces a resulting movement of the nipper 103 between the second circumference 136 of the transferring star and the first circumference 155 of the machine, wherein such movement is homokinetic.

This produces the advantage that the preform has reduced values of accelerations along its path between the transferring star 130 and the rotary machine 1, thereby preventing the triggering of dangerous uncontrolled oscillatory movements of the preform which would risk making the heated preform come into contact with the inner walls of the cold mould before blowing, leading to a moulding defect.

In one embodiment, said movement means 102 comprise a gear transmission configured to transmit a first alternate shift in a radial direction of a motion input element 106 into a second alternate shift in a radial direction of an output element 111 to which the gripping nipper 103 is attached, wherein the second alternate relative shift is greater than the first alternate shift.

According to one embodiment the gear transmission comprises:
- a ratchet having a rotation axis 101, a first wheel 107 and a second wheel 108 of greater diameter, said first wheel 107 and said second wheel 108 being coaxial and integral with each other and with the ratchet 101, said ratchet ending with said meter motion input element 106;
- a first rack 109 fixed in relation to the machine, said first wheel 107 meshing with said fixed rack 109 so that a radial translation of the input element 106 corresponds to a rotation of the ratchet;
- a second rack 110 sliding in a radial direction in relation to the machine, said second wheel 108 meshing with said sliding rack 110, so that a rotation of the second wheel 108 corresponds to a translation of said second rack 110; said second rack being rigidly connected to the output element 111.

According to one embodiment of the invention, the second shift is a multiple of the first shift according to a transmission ratio of 1.5 to 3, for example substantially equal to 2.5.

According to one embodiment the first wheel 107 and the second wheel 108 are wheels externally toothed, and said first rack 109 and said second rack 110 are toothed racks with a linear extension.

According to one embodiment the first rack 109 and the second rack 110 are positioned substantially parallel on opposite sides of the axis 101 of the ratchet and in a radial direction in relation the machine.

According to one embodiment the first wheel 107 and the second wheel 108 are positioned at different heights along the axis 101 of the ratchet.

According to one embodiment, the output element 111 has a first end rigidly connected to said second rack 110 and a second end rigidly connected to said gripping nipper 103, said output element being configured to keep the gripping nipper 103 substantially parallel to the second rack 110, in particular at a lesser height than the height of the second rack 110.

According to one embodiment the output element 111 comprises at least one plate positioned along a substantially vertical plane.

According to one embodiment the input element 106 is a cam follower for a shaped cam, suitable for being alternately translated in a radial direction to the rotation axis of the machine, following a sliding coupling along a shaped profile 12 of said cam.

Figure 12:
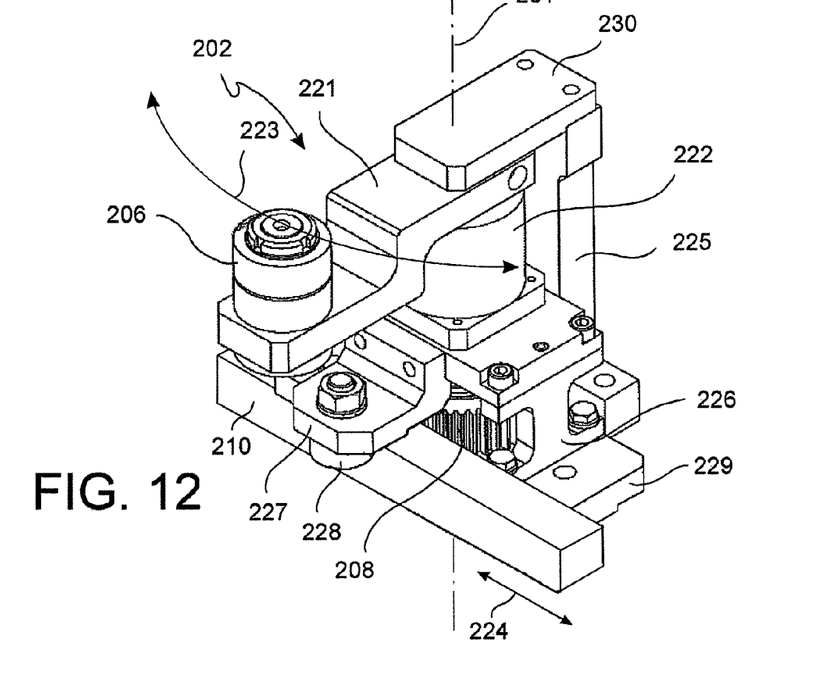
FIGS. 12 and 13 respectively show a perspective and cross-section view with a plane orthogonal to the radial direction of the machine, in a second embodiment of the movement means.
Figure 13:
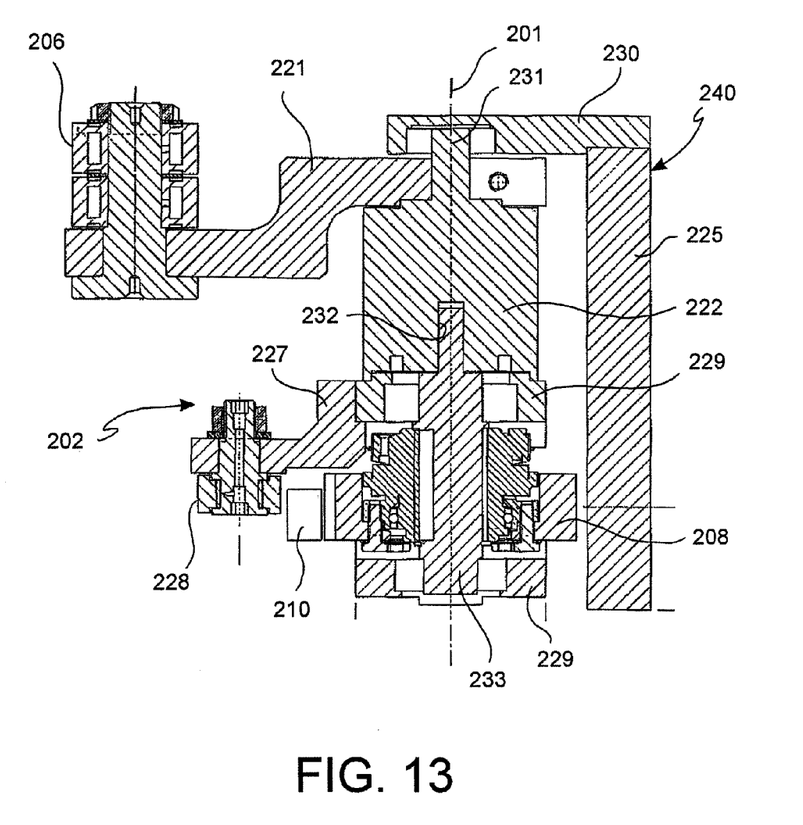

According to a second embodiment of the present invention, shown in FIGS. 12 and 13, the movement means 202 comprise a motion transmission configured to transmit a first alternate angular shift 223 of a lever element 221 connected to a meter motion input element 206 into second alternate linear shift 224 in a radial direction of an output element 111 to which the gripping nipper 103 is rigidly connected.

According to such embodiment, the movement means 202 comprises a toothed wheel 208 carried in rotation by said lever element 221 around a rotation axis 201, said wheel meshing with a second rack 210, integral with the nipper 103, so that a rotation of the lever element 221 corresponds to a translation of the rack 210. The rack 210 is the same rack as that indicated by reference numeral 110 in the first embodiment shown in FIGS. 5 to 8.

The toothed wheel 208 may be fitted on a shaft 233 connected to a fixed support 229 so as to rotate.

The fixed support 229 may comprise a projecting shelf element 227 having at one end an abutment roller 228 suitable for constraining the rack 210 in a meshed condition with the toothed wheel 208.

Between the lever element 221 and the toothed wheel 208 an angular speed multiplier 222 may be positioned, having an input rigidly connected to the lever element 221 and an output 232 rigidly connected to the toothed wheel 208, for example by means of a shaft 233.

According to one embodiment the angular speed multiplier 222 is of the planetary gear type. According to one embodiment the movement means 202 are supported by a fixed, L-shaped support bracket 240 comprising an element substantially parallel to the rotation axis 201 and an element substantially orthogonal to such rotation axis 201.

According to one embodiment said nipper 103 comprises a coupling portion 104 comprising two pincers 105 projecting from a free end of the nipper 103, said coupling pincers 105 being positioned substantially parallel to each other and defining between them a retention seat 113 suitable for receiving and snap engaging the mouth of a preform.

According to one embodiment said retention seat 113 has at least partially circular shape so as to embrace the mouth and present a front aperture to permit the coupling of the mouth in the seat 133 by means of a relative drawing together of the nipper 13 and the preform and the release of the mouth by means of the relative translation away from each other of the nipper and the preform.

According to one embodiment the pincers 105 of the nipper present at the front guide profiles inclined towards the inside of the retention seat 113, suitable for facilitating the entrance of the mouth of the preform in the seat 113.

According to one embodiment the coupling portion 104 is made of an elastic material, for example but not necessarily in harmonic steel.

According to one embodiment the coupling portion 104 is formed of a U-shaped plate having an aperture positioned in a radial direction outwards in relation to a rotation axis 2 of the stretch-blowing machine 1.

According to one embodiment said coupling portion 104 extends substantially according to a horizontal plane.

According to one embodiment said nipper 103 comprises an elongated connection portion 114 positioned between said movement means 102 of the gripping nipper 112 and the coupling portion 104, said elongated body extending, for example but not necessarily, in a radial direction opposite the rotation axis 2 of the rotary machine 1.

According to one embodiment said elongated connection body 114 is a flat shape and extends substantially along a horizontal plane.

According to one embodiment said coupling portion 104 and said elongated connection body 114 extend along the same plane.

According to one embodiment each moulding unit 10 comprises a mould 20 which can be opened having an inner cavity 24 suitable for receiving the preheated preform and permitting within it the expansion thereof by blowing inside the preform. Such cavity 24 may comprises a moulding surface 25 having a complementary shape to that of the bottle to be obtained.

In one embodiment, the mould 20 comprises a universal seat 26 for removably housing a mould element 27 shaped so as to comprise said moulding surface 25.

In one embodiment, each said mould 20 comprises a first half-shell 21 and a second half-shell 22 hinged around a hinge axis 23 so that they can be opened and closed by means of a rotation opening and closing the same around the hinge axis. When closed, the aforementioned half-shells 21 and 22 form between them a through seat 156 which places the cavity 24 in communication with the outside suitable for housing the mouth of the preform so that such mouth remains facing outwards while the remaining portion of the preform remains inside the cavity 244, to allow the introduction of pressurised air inside the preform through the mouth, to expand the preform 134 in the inner cavity 24 until it adheres to the moulding surface 25, and impress upon the preform a shape complementary to that of the moulding surface 25, complementary to that of the bottle to be obtained.

In one embodiment, the moulding units comprise means of opening and closing the moulds 20, wherein such means are synchronised with the movement means 102 of the nipper 103 so that during at least a part of the translation movement of the nipper 103, the half-shells are opened so as to permit the introduction of the preform in the moulds and the extraction of the bottle moulded by the moulds.

According to one embodiment the opening/closing means of the moulding unit 10 comprise a self-locking system suitable for keeping the half-shells pressed together in a closed position during the blowing operation.

In the example of the blowing or stretch blowing machine 1 shown in the figures, the moulding units 10 are attached to a rotating platform 153 which rotates around the rotation axis 2 of the machine.

The blowing or stretch-blowing machine may be coupled to a second rotating star 140 unloading the moulded bottles 141, having a plurality of seats for said bottles.

After the moulding operation, and after a rotation of the machine by a predetermined angle, the nipper 103 translates outwards to transfer the moulded bottle 141, from the inside of the mould towards the bottle seat of the aforesaid second rotating star 140.

According to one possible embodiment, the moulding units 10 of the machine 1 are angularly equidistant from one another.

According to one embodiment the seats 134 of the transferring star 130 are angularly equidistant from one another.

According to one embodiment the seats for the bottles 141 of the second rotating star 140 are angularly equidistant from one another.

According to one embodiment the rotation axis 135 of the transferring star 130 is placed at a distance from the rotation axis 2 of the machine, having a value greater than the sum of the radius R1 of the second circumference and of the radius R2 of the first circumference 155, leaving a distance D between the first circumference 155 and the second circumference 136 the value of which is chosen so as to be able to obtain a transfer movement of the nipper 103 which is homokinetic at the pick-up point of the preform.

Figure 14:
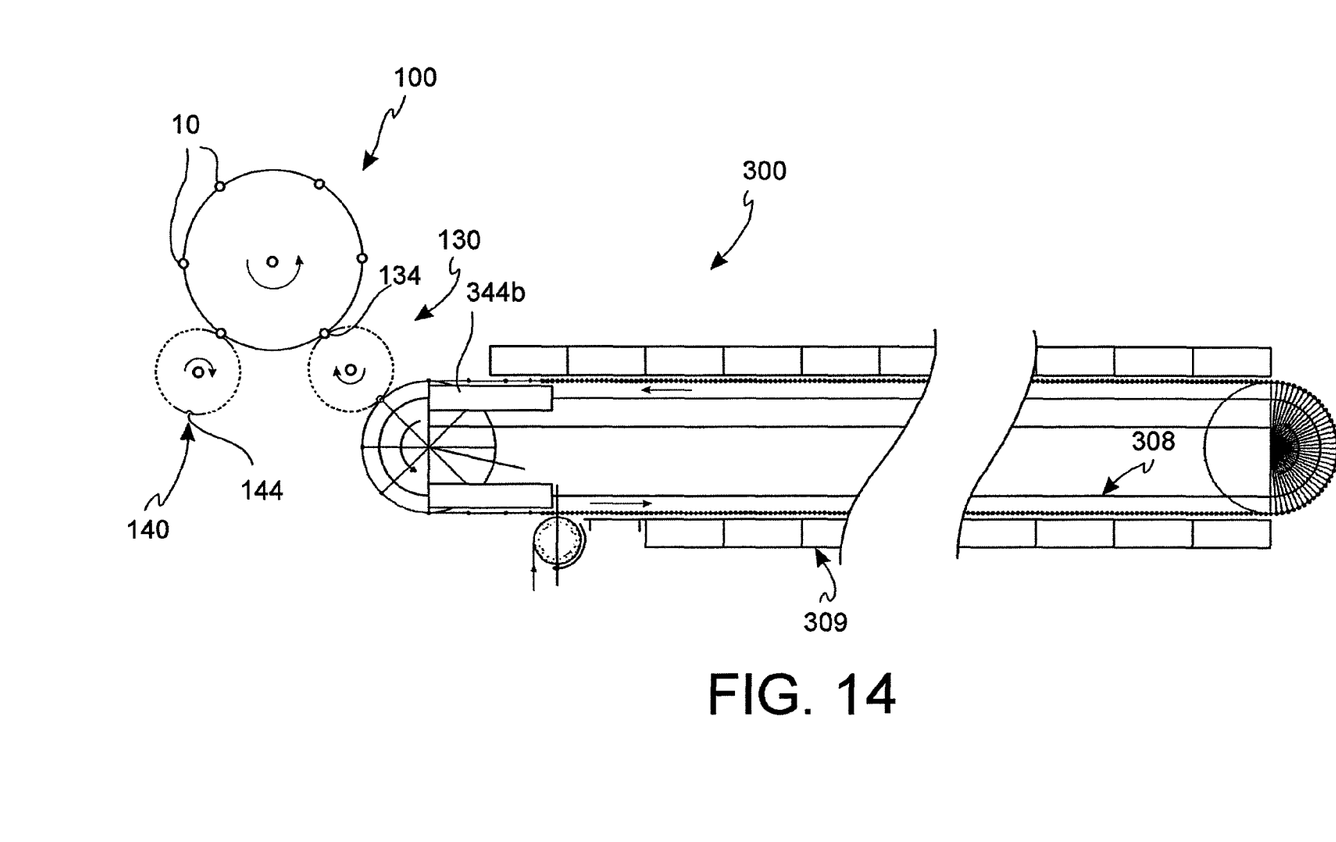
FIG. 14 schematically shows a view from above of equipment for making containers from preforms according to a particular aspect of the invention.

According to one embodiment the handling system comprises transfer means of the preheated preforms from the preheating furnace 300 to the aforesaid transferring star 130 (FIG. 14)

The functioning of the handling system of objects between a transferring star 130 and a rotary machine 1 comprising a plurality of processing units 10, is as follows.

Each preheated preform 133 coming out of a preheating furnace 300 is taken to a seat for preforms of the transferring star 130, which rotates around its axis 135, for example in a clockwise direction in the direction of the arrow 132.

Figure 1:
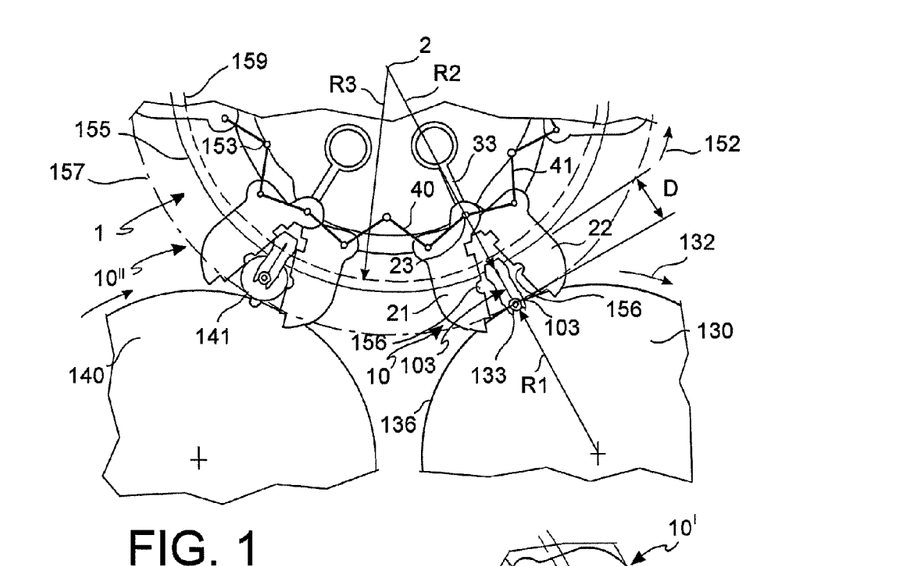
FIGS. 1 to 4 schematically show a partial view from above of the functioning of a stretch-blowing machine comprising a handling system according to the invention, respectively in four different subsequent positions during a processing cycle of the machine.

After a rotation of the transferring star according to a predetermined angle of rotation, the preform finds itself in a point of the second circumference 136 in which the nipper simultaneously advances homokinetically coupling the preform. In such point, the half-shells are open to allow the subsequent introduction of the preform in the cavity between the half-shells (FIG. 1).

Starting from such point the nipper 103 begins its radial translation according to a rearward movement towards the machine axis 1, simultaneously with the rotation of said machine. The section of curved trajectory 161 performed by the nipper 103 from the pick-up point 163 of the transferring star on the second circumference 136, as far as the first circumference 155 (FIG. 2) derives from the combination of such radial translation and the rotation movement of the machine.

Figure 2:
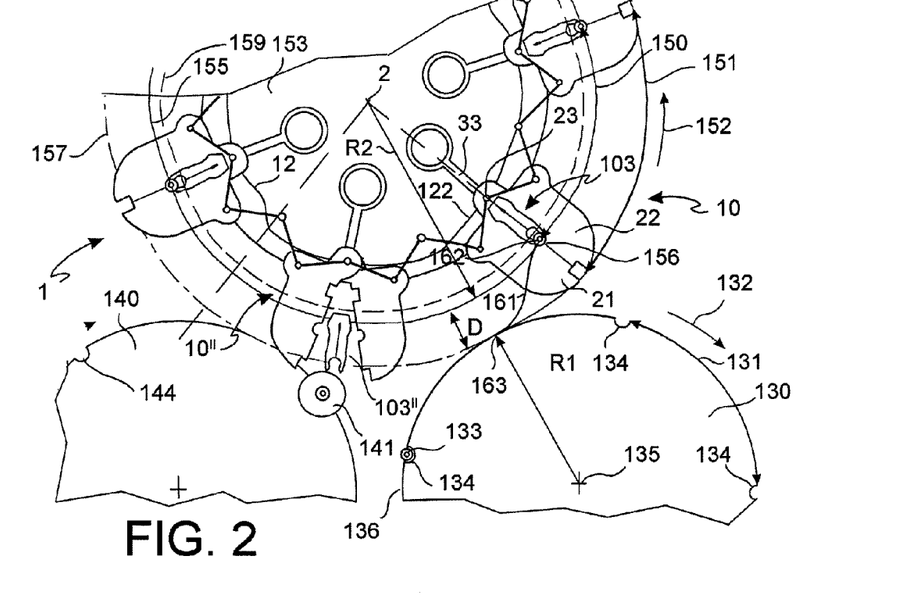
Figure 3:
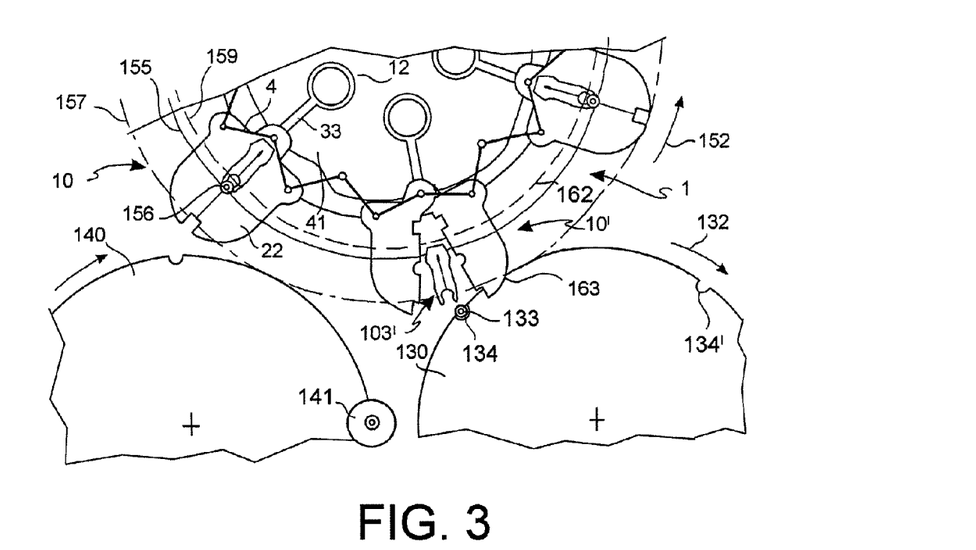
Figure 4:
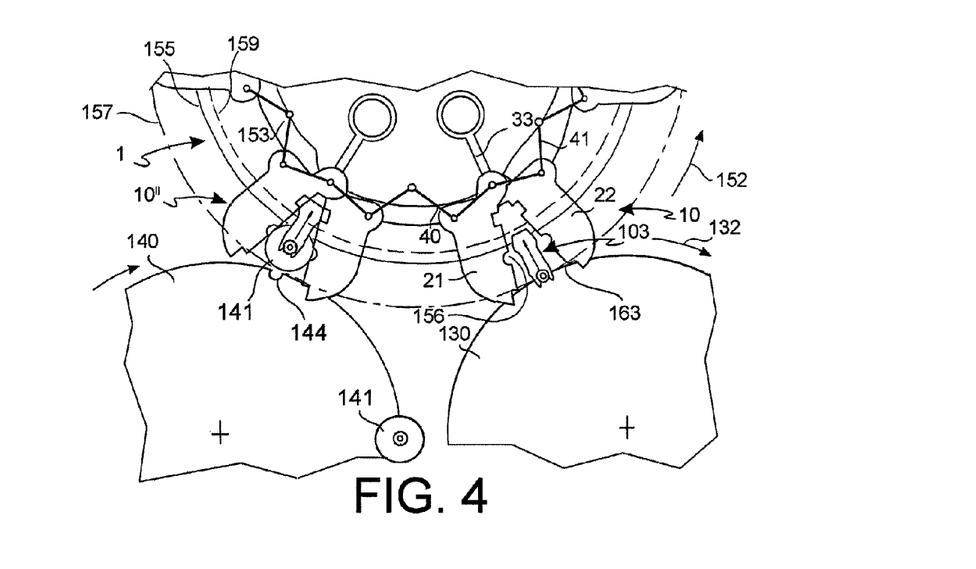
Figure 5:
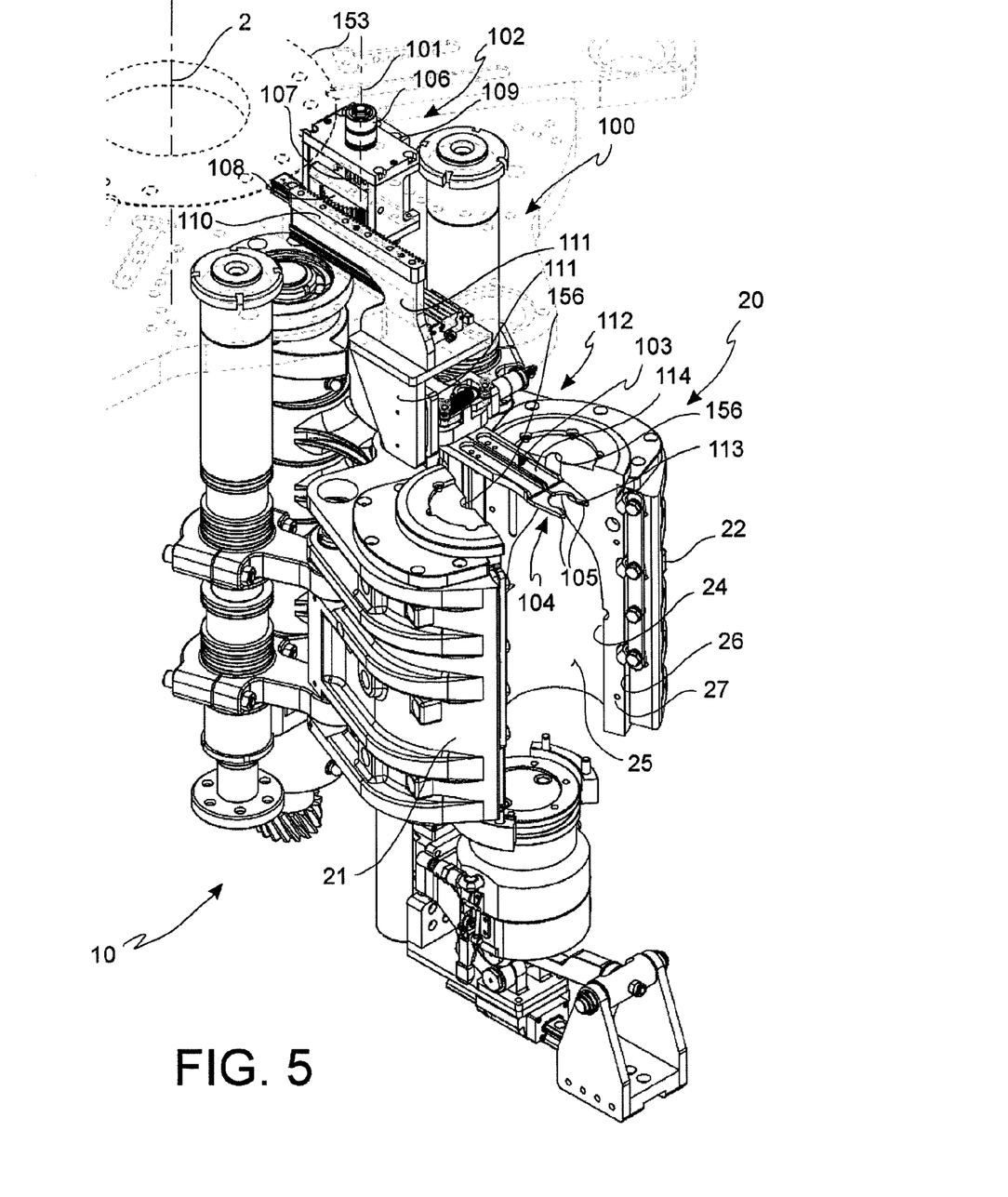
FIGS. 5 and 6 show a handling system in a perspective view together with a moulding unit of the stretch-moulding machine, respectively in a forward and in a retracted position.
Figure 6:
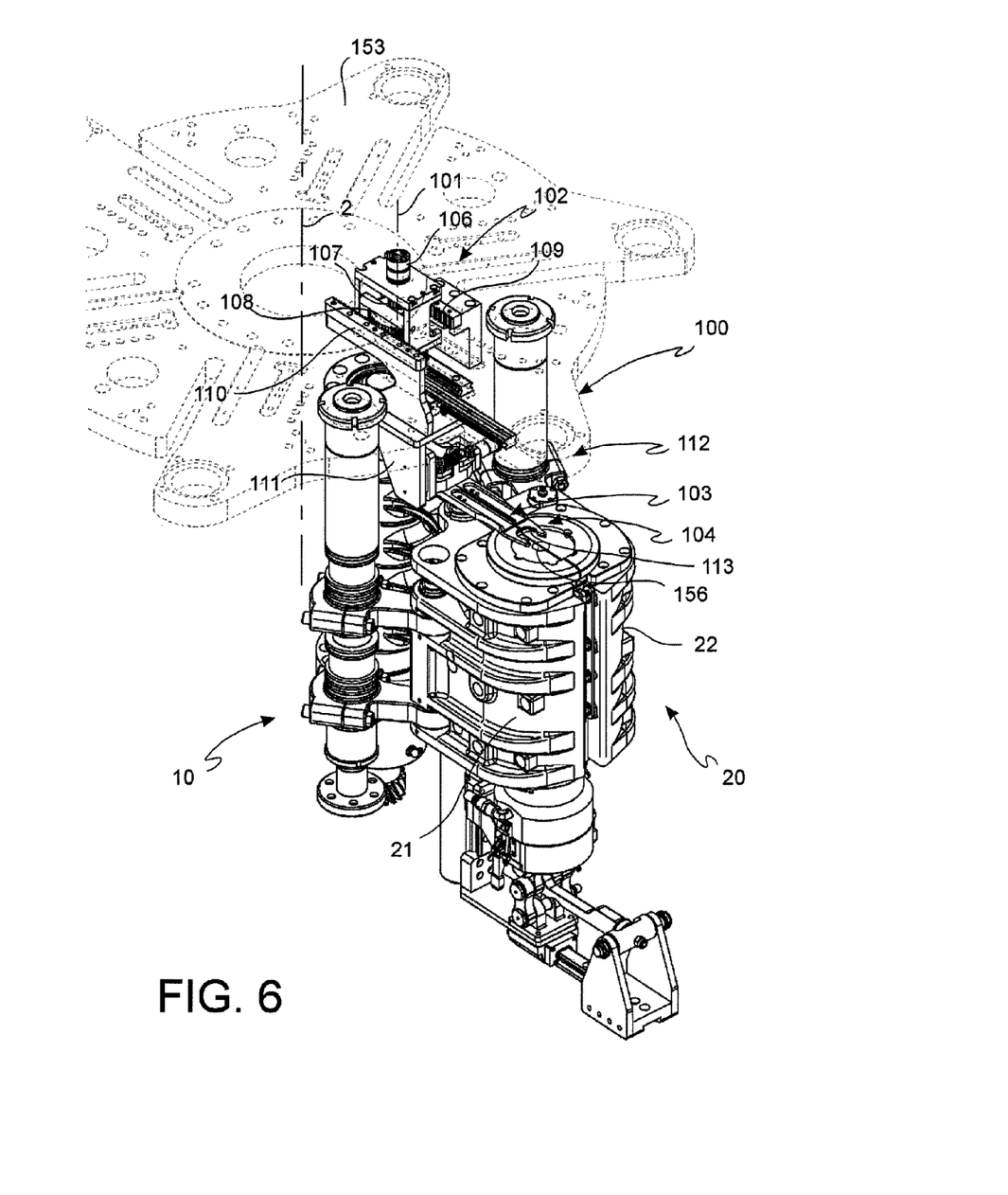
Figure 7:
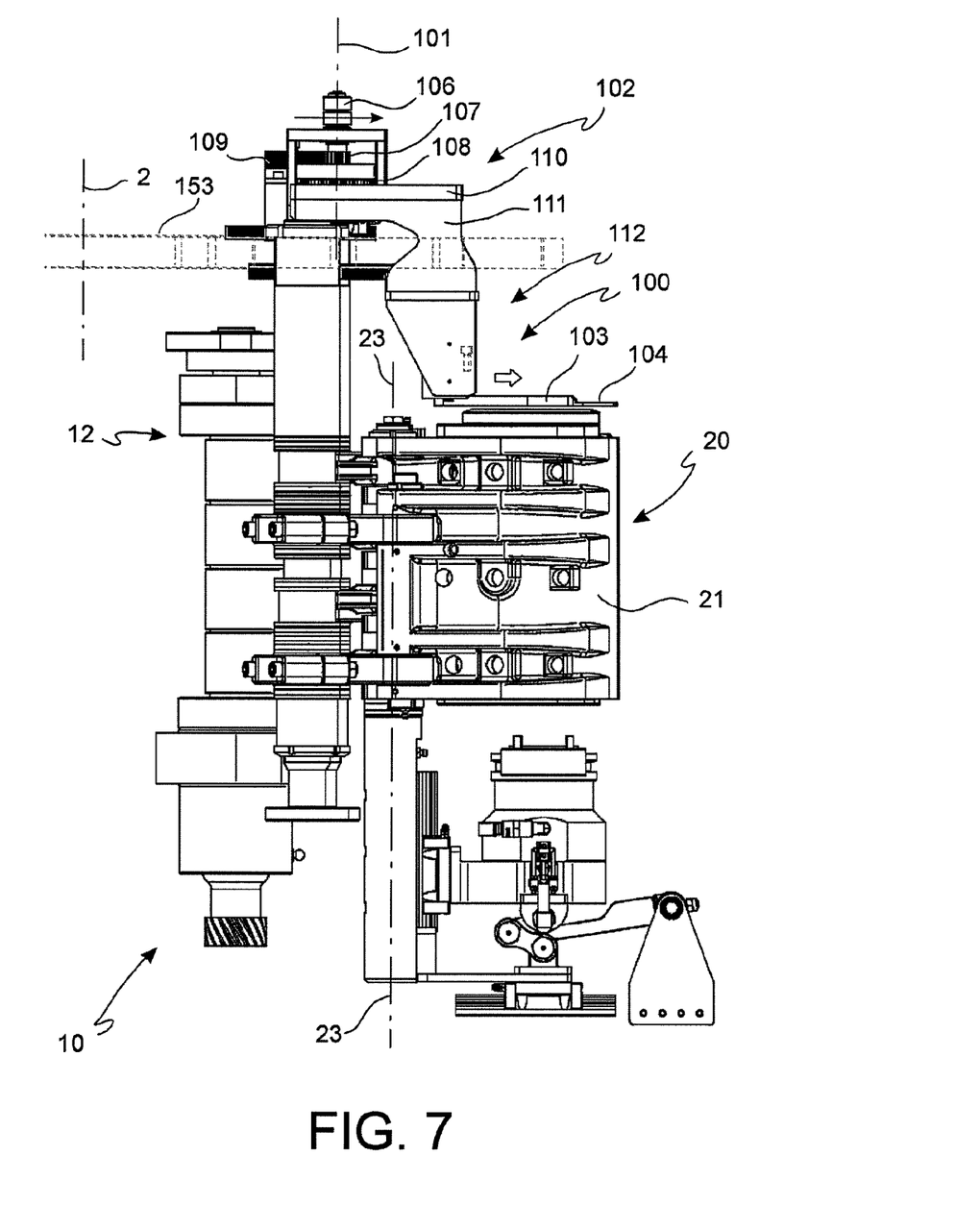
FIGS. 7 and 8 show a side view of a handling system together with a moulding unit of the stretch-moulding machine, respectively in a forward and in a retracted position.
Figure 8:
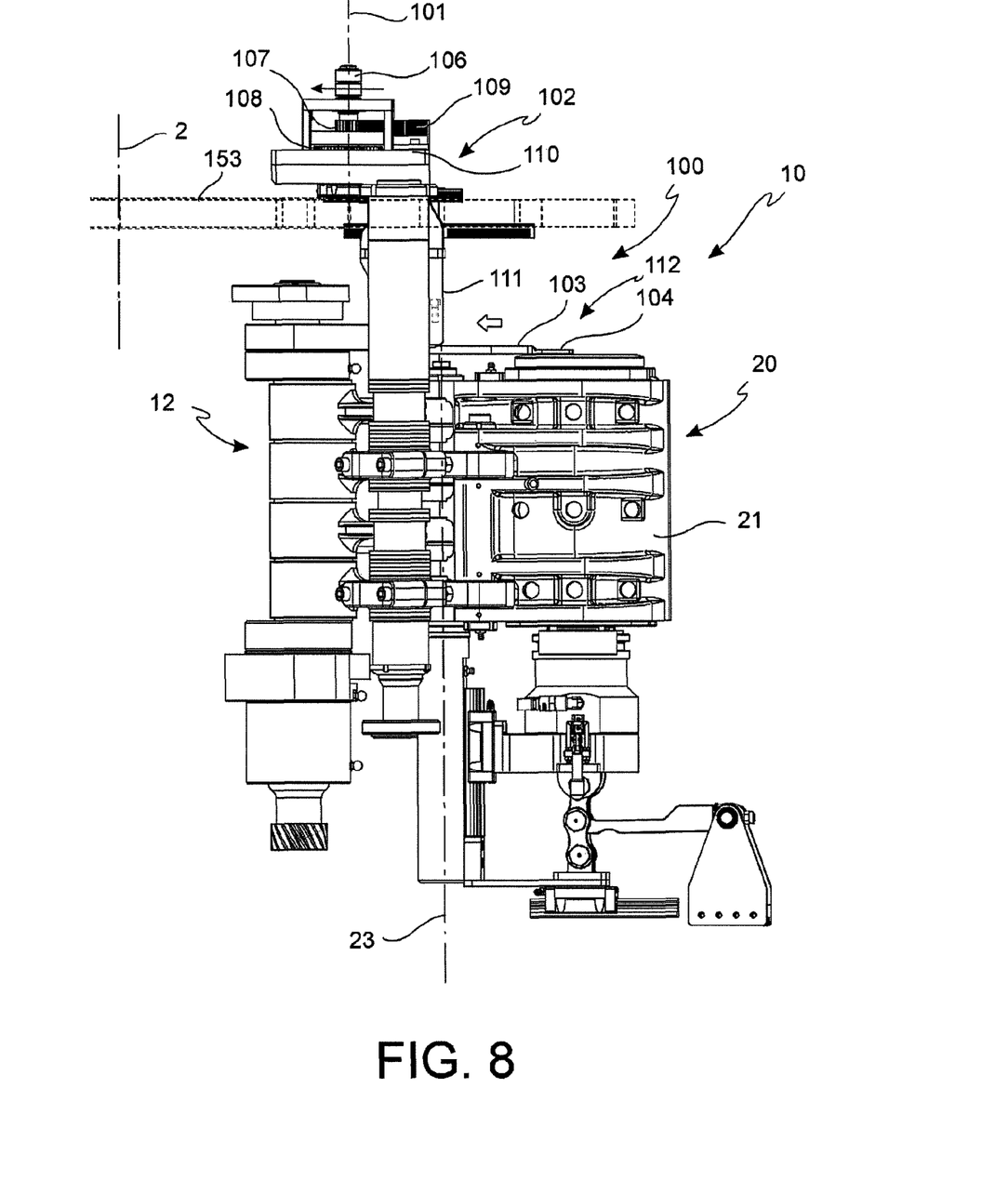
Figure 9:
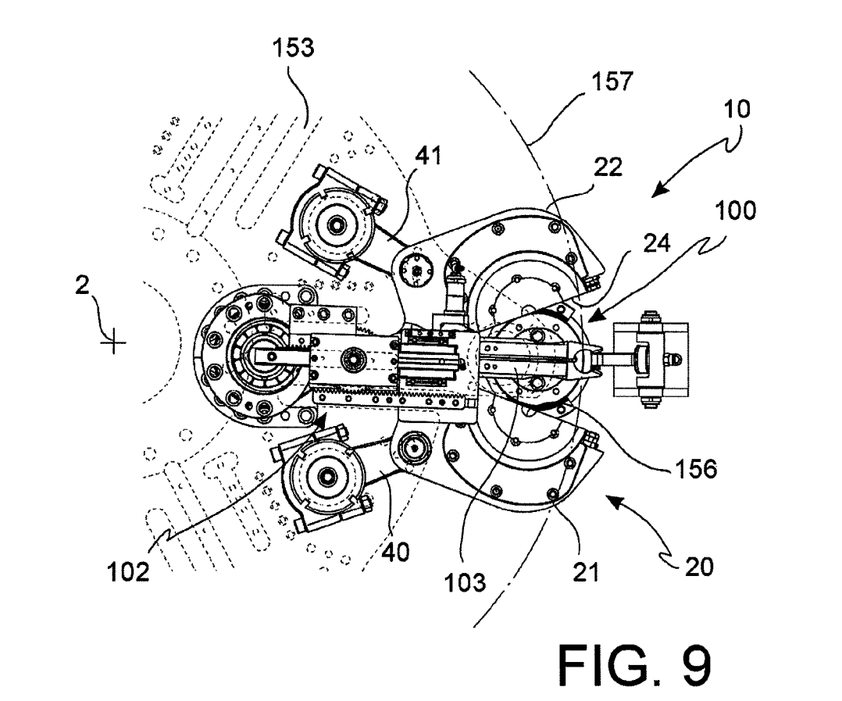
FIGS. 9 and 10 show a view from above of a handling system together with a moulding unit of the stretch-moulding machine, respectively in a forward and in a retracted position.
Figure 10:
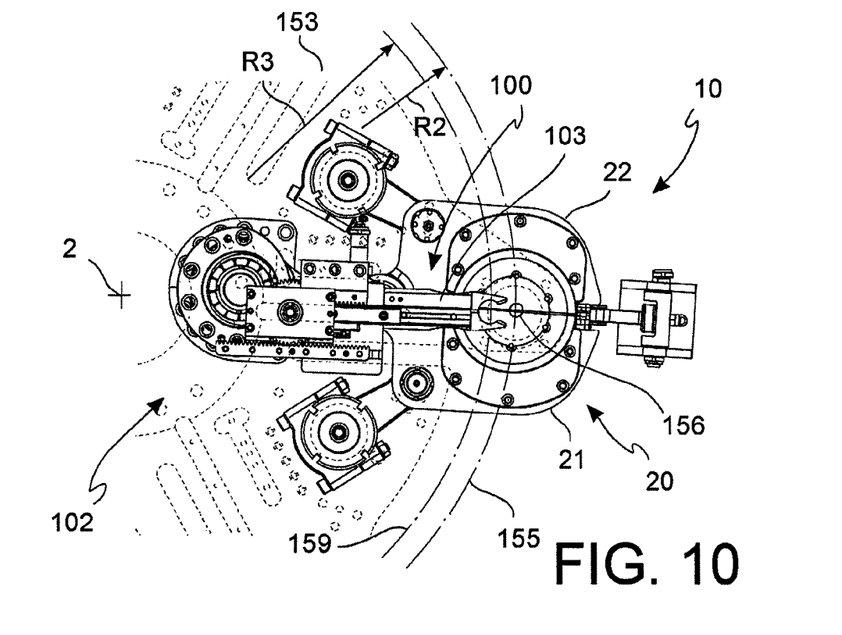
Figure 11:
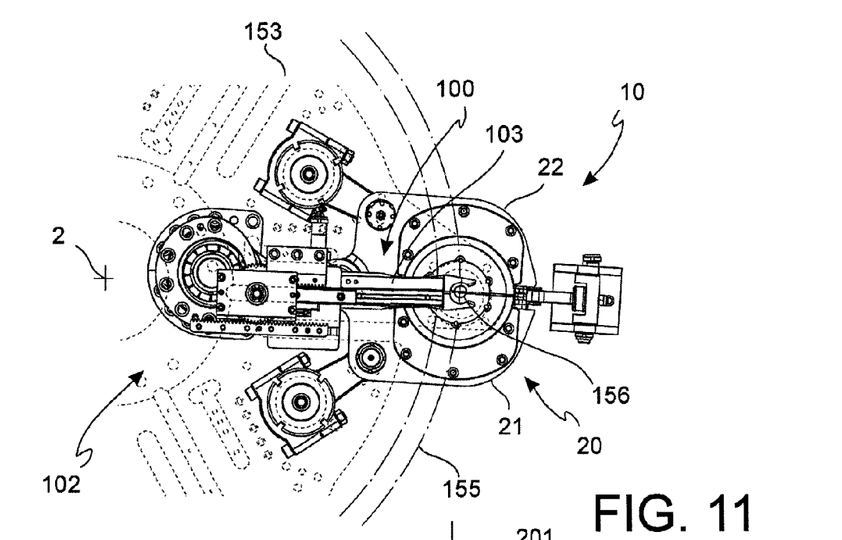
FIG. 11 shows a view from above of a handling system together with a moulding unit of the stretch-moulding machine, in which the nipper is in a retracted position lying on a first circumference of the machine.

The passage of the preform, coupled to the nipper 103, from the star to the stretch-blowing machine takes place homokinetically.

When the preform is transferred by the nipper 103 inside the corresponding moulding unit 10 and the half-shells 21 and 22 are then closed, the preform begins its path along the first circumference 155 of the machine during which blowing is performed, as far as a predetermined angular position on the opposite side, wherein the half shells 21 and 22 open to allow the unloading of the moulded bottle 141. Unloading takes place by means of a radial translation of the nipper 103 towards the outside of the machine as far as encountering a corresponding seat 144 for bottles made on the second rotating star 140, which rotating transfers the bottle obtained 141 towards a collection zone, or towards a subsequent bottling station for example of liquids.

A further purpose of the invention relates to equipment for blowing or stretch-blowing bottles in plastic material, comprising a furnace 300 for heating and dealing with the heat profile of the preforms 133, a blowing or stretch-blowing machine 100, comprising a plurality of processing units 10 as defined above, and movement means 130, 140 of the preforms going into and coming out of said furnace 300, wherein said furnace 300 comprises means of transport 308 for the preforms and means of heating 309 the preforms, and wherein said movement means 130 for the preforms coming out of the furnace 300, comprise a plurality of gripping means 134 for the preforms spaced apart at a fixed pitch, characterised in that said furnace 300 comprises movement and distancing means 344b of the heated preforms 133, from a minimum pitch to a pitch substantially corresponding to the pitch of the gripping means 134 of the movement means 130 for the preforms coming out of the furnace 300.

A furnace having the aforementioned features is described in the Italian patent application MI2011A001762 filed on 30 Sep. 2011 in the name of the same Applicant, and the description of which is incorporated hereto for reference.

This way a homokinetic transmission system of the preforms 133 is realised, from the furnace 300 to the single processing units 10 of the blowing or stretch blowing machine, minimising or substantially eliminating the accelerations to which said preforms are subject in the traditional machines.

In one embodiment, said movement and distancing means 344b of the heated preforms 133 consist of an Archimedean screw or auger comprising a variable pitch helical groove, wherein the greatest pitch is at the release end of the preforms to the movement means 130.

The advantages of this solution are various.

First of all, the handling system described makes it possible to transfer the preheated preform from the transferring star as far as inside the mould, homokinetically.

In other words, the system makes it possible to transfer the preheated preform from the transferring star as far as inside the mould, avoiding subjecting the preform to jolting and brusque variations of speed upon passing from its circular trajectory along the second circumference of the transferring star to its different circular trajectory along the first circumference of the blowing machine.

The system makes it possible to transfer the preheated preform from a first circumference having a first pitch to a second circumference having a second pitch, in which the second pitch is different from the first pitch and wherein said circumferences are not tangent, such that the aforesaid transfer takes place at reduced tangential acceleration.

Clearly only some particular embodiments of the present invention have been described, to which a person skilled in the art may make all the modifications needed for its adaptation to specific applications while remaining within the scope of protection of the present invention.

The invention claimed is:

1. Handling system of objects between a transferring star and a rotary machine comprising a plurality of processing units, wherein said transferring star comprises along its perimeter a plurality of seats for housing said objects, said processing units being spaced apart by a first pitch along a first circumference and said seats being spaced apart by a second pitch along a second circumference, wherein said second pitch is different from said first pitch and wherein said circumferences are not tangent,
said handling system comprising a gripping unit for each processing unit, wherein said gripping unit comprises:
a gripping nipper suitable for gripping said object; and
movement means of said gripping nipper suitable for alternatively moving said nipper between a first radial position, at the processing unit, and a second radial position at a seat of the transferring star, wherein said movement means comprise a gear transmission configured to transmit a first alternate shift in a radial direction of a motion input element into a second alternate shift in a radial direction of an output element to which the gripping nipper is attached, wherein the second alternate shift is greater than the first alternate shift.

2. Handling system according to claim 1, wherein said movement means of the gripping nipper comprise means of translation in a radial direction of the nipper in relation to the rotation axis of the rotary machine alternately between an extended position lying on said second circumference and a retracted position lying on said first circumference.

3. Handling system according to claim 1, wherein said movement means of the gripping nipper are configured to make the nipper translate in a radial direction in relation to the rotation axis of the rotary machine alternately between an extended position lying on said second circumference and a retracted position lying on said first circumference.

4. Handling system according to claim 1, wherein said movement means of the gripping nipper are configured to make the nipper translate in a radial direction in relation to the rotation axis of the rotary machine alternately between an extended position lying on said second circumference and a retracted uncoupled position lying on an uncoupling circumference concentric with said first circumference and having a radius R3 less than the radius R2 of said first circumference.

5. Handling system according to claim 2, wherein said movement means of the gripping nipper act contemporarily with the rotation of the rotary machine, conducting the gripping nipper along a curved section of trajectory having its centre of curvature on the rotation axis of the rotary machine and having a radius varying from a second value corresponding to the radius of the second circumference and a first value corresponding to the radius of the first circumference.

6. Handling system according to claim 4, wherein said movement means comprise a motion transmission configured to transmit a first alternate angular shift of a lever element connected to a motion input element into a second alternate linear shift in a radial direction of an output element to which the gripping nipper is rigidly connected.

7. Handling system according to claim 1, wherein the gear transmission comprises:
a ratchet having a rotation axis, a first wheel and a second wheel of greater diameter, said first wheel and said second wheel being coaxial and integral with each other and with the ratchet, said ratchet ending with said motion input element;
a first rack fixed in relation to the machine, said first wheel meshing with said fixed rack so that a radial translation of the input element corresponds to a rotation of the ratchet;
a second rack sliding in a radial direction in relation to the machine, said second wheel meshing with said sliding rack, so that a rotation of the second wheel corresponds to a translation of the second rack said second rack being rigidly connected to the output element.

8. Handling system according to claim 1, wherein said objects are preforms in polymer material for making bottles or containers, wherein the aforesaid rotary machine is also a stretch-blowing machine for preforms and wherein the aforesaid processing units are stretch-blowing moulding units.

9. Handling system of objects according to claim 1, wherein said nipper comprises a coupling portion comprising two pincers projecting from a free end of the nipper, said coupling pincers being positioned substantially parallel to each other and defining between them a retention seat suitable for receiving and snap engaging the mouth of a preform, and/or wherein said retention seat has an at least partially circular shape so as to embrace the mouth and present a front aperture to permit the coupling of the mouth in the seat by means of a relative drawing together of the nipper and the preform and to release of the mouth by means of the relative translation away from each other of the nipper and the preform.

10. Apparatus for blowing or stretch-blowing bottles made of plastic material, comprising a furnace for heating and dealing with the heat profile of the preforms, a blowing or stretch-blowing machine, comprising a plurality of processing units as defined in claim 1, and movement means of the preforms going into and coming out of the furnace said machine, wherein said furnace comprises means of transport for the preforms and heating means of the preforms, and wherein said movement means for the preforms exiting the furnace comprise a plurality of gripping means for the preforms spaced apart at a fixed pitch, wherein said furnace comprises movement and spacing means of the heated preforms from a minimum pitch to a pitch substantially corresponding to the pitch of the gripping means of the movement means of the preforms exiting the furnace.

11. Processing unit for a rotary machine, comprising a handling system of objects between said processing unit and a transferring star external to said processing unit, said transferring star comprising along its perimeter a plurality of seats for housing said objects, said handling system comprising a gripping unit, said gripping unit being mounted on said processing unit, said gripping unit comprising:

a gripping nipper suitable for gripping said object; and movement means for alternatively moving said gripping nipper between a first radial retracted position at the processing unit and a second radial forward position at a seat of the transferring star, wherein said movement means comprise a gear transmission configured to transmit a first alternate shift in a radial direction of a motion input element into a second alternate shift in a radial direction of an output element to which the gripping nipper is attached, wherein the second alternate shift is greater than the first alternate shift.

12. A rotary machine comprising a plurality of processing units according to claim 11, wherein each processing unit comprises a handling system for handling of objects between said processing unit and a transferring star, said processing units being spaced apart by a first pitch along a first circumference, and said transferring star comprising, along its perimeter, a plurality of seats for housing said objects, which are spaced apart by a second pitch along a second circumference, wherein said second pitch is different from said first pitch, and wherein said circumferences are not tangent.

* * * * *